United States Patent Office 3,288,616
Patented Nov. 29, 1966

3,288,616
REFRACTORY AND METHOD OF MAKING
Jan Bowman, Los Gatos, Calif., assignor to Kaiser Aluminum & Chemical Corporation, Oakland, Calif., a corporation of Delaware
No Drawing. Filed Nov. 15, 1963, Ser. No. 323,917
5 Claims. (Cl. 106—58)

This invention concerns refractories and methods of making them, particularly refractories containing tar or pitch.

In recent years there has been a marked increase in the use of refractories, particularly those based on nonacid materials such as magnesite, magnesia, periclase, chromite, dolomite, and mixtures of these, containing tar or pitch. Such tar bonded refractories, as they are often called, are particularly useful in lining oxygen converters, for example those used in the L-D process of making steel. These tar bonded refractories may be used as preformed shapes or as granular mixtures which can be cast, gunned, or rammed into place to form a monolithic structure.

The customary way of forming tar bonded shapes is to preheat a tar with a relatively low temperature softening point (e.g., up to about 250° F.) and combine this molten tar with preheated refractory grain. The mixture then is formed to a shape, for example as by vibration pressing. The problems associated with the forming of refractory shapes containing hot molten tar are well known to those skilled in the art, and many efforts have been made to avoid them. Also, it is clear that a mixture of refractory grain and molten tar is not suitable for use as a gunning, casting, or ramming mixture.

One method of avoiding the problems of working with molten tar is to use a ground pitch having a considerably higher softening point, e.g., above 250° F. and as high as 450° F. This hard pitch is a solid at room temperature and therefore more readily handled in a granular mix, as with a refractory grain. However, the pitches which are solid at room temperature provide relatively little bonding between the refractory grains and therefore do not geneally provide a shaped refractory with adequate strength for handling during manufacture, shipment, and installation. Accordingly, it has been necessary, when using a hard pitch in combination with refractory grain, to incorporate a cold setting bond or room temperature cement or binder in the mixture, whether it is to be formed into shapes or used for gunning, casting, or ramming.

One advantage of using a hard or high softening point pitch in conjunction with refractory grain is that such pitches, after coking (e.g., heating to 850° C. for 8 hours), show a residual or fixed carbon content which is higher than that of tars of lower softening point. It has been found that this higher fixed carbon content results in a stronger refractory and one more resistant to attack by molten metal, slag, fumes, and the like.

In addition to the problems mentioned above, which are peculiar to refractories incorporating tar or pitch, it is of course desired that such refractories have the usual desirable properties of high strength (particularly at or after heating to intermediate temperatures, i.e., from 100° C. to 500° C.), good spalling resistance, high bulk density, and other properties known to be desirable in refractory products.

It has now been discovered that a superior refractory shape (e.g., a brick) can be made by mixing together nonacid refractory grain, from about 2% to about 10%, based on total dry weight of the mixture, of a hard (i.e., cube in air softening point of at least about 250° F.) pitch, and a tempering amount of water (for example from 2% to about 5% of the weight of dry ingredients), forming this mixture, as by pressing in a mold for example, to form a refractory shape, and drying the shape at a temperature substantially as high as the softening point of the pitch, for example for a period of from 4 to 8 hours.

It has also been discovered that the strength of shapes formed by the above method is enhanced when the mixture contains in addition from 0.5% to 4%, based on total dry wieght of the mixture, of volatilized silica. The composition to be formed can also contain a room temperature or cold setting cement or binder, for example sodium silicate, a Sorel cement, a phosphate cement, or the like.

It has also been discovered that the incorporation of from 0.5% to 4% of volatilized silica in a refractory composition containing nonacid grain and a hard pitch yields a stronger product, particularly one showing increased strength at, or after heating to, intermediate temperatures when the refractory composition is used for ramming, casting, or gunning. Again, a room temperature or cold setting cement or binder, as before mentioned, can be added to the gunning, casting, or ramming mix containing nonacid grain, hard pitch, and volatilized silica.

The nonacid grain used in the practice of this invention can be deadburned magnesite, or magnesia, periclase, chrome ore, deadburned dolomite, or mixtures of these materials, as is well known in the art. The nonacid grain will be of such sizing or graded sizes that the compacted mass will have the maximum bulk density, again as is well known in the art. Specific examples of suitable sizings, which are illustrative only, are given in the examples which follow. In general, the grain will consist of a mixture of coarse, intermediate, and fine particles in such amounts that the finer particles tend to fill the spaces between the coarser.

The pitch used in this invention has a softening point, by the cube in air method, of from about 250° F. to about 450° F. A preferred pitch is one with a softening point from about 300° F. to 320° F. The pitch may, for example, be in flake form, wherein substantially all the pitch passes a 4 mesh screen and is retained on a 100 mesh screen. However, it is preferred that the pitch be pulverized. It is especially advantageous that it be of such size that substantially all passes a 100 mesh screen and about 85% passes a 325 mesh screen. While pitches obtained from coal tar are preferred, pitches from other sources, for example petroleum based pitches, can be used.

The volatilized silica used in this invention is a fine amorphous powder formed by deposition from the vapor state. A typical source is the by-product silica formed in the production of ferro silicon, the silica being deposited from the vapors issuing from the zone wherein iron oxide, carbon and silica are being reacted to form ferrosilicon. Typically, the volatilized silica of commerce has a $SiO_2$ content of at least 90% and generally about 95%; the iron, magnesium, and aluminum oxides present total about 2.5%, other impurities amount to about 0.5%, and there is typically a 2% ignition loss. This ignition loss is substantially all due to the carbon content of the material. While volatilized silica, as above described, is a preferred material for this invention, other equivalent finely divided silicas may be substituted.

The cold or room temperature setting cement or chemical bonds or binders which may be used in conjunction with the practice of this invention are any of those well known in the art, for example sodium silicates, chromic acid, phosphate cements, Sorel cements, and the like. A preferred material is sodium tripolyphosphate.

It is an advantage of the method of the present invention that by it a pitch containing refractory shape can be formed by conventional methods at room temperature, said shape being strong and having a high fixed carbon content after coking, e.g., heating to 850° C. for 8 hours. It is also an advantage of the compositions according to this invention that they provide refractories of increased strength, particularly at or after heating to intermediate temperatures, whether used as preformed shapes or as ramming or gunning or casting mixes. Compositions of this invention can also be used as gunning or ramming mixes. Thus, for example, the composition of Example IV below was gunned into a converter used in the basic oxygen steel process to patch a worn spot in the lining. The material of the patch showed erosion resistance as good as that of preformed shapes.

The following examples are presented as illustrative of the practice of this invention and are not intended to limit the scope thereof.

*Example I*

Periclase grain, all less than ⅜" in size and 15% passing a 100 mesh screen, was mixed with 5 parts by weight pulverized pitch (300° to 325° F. softening point), and 4% tempering water. The mixture was then pressed at 10,000 p.s.i. to the shape of a standard 9 x 4½ x 3 inch brick and dried for 8 hours at a temperature of 300° F. The resulting shape had a bulk density of 165 lbs. per cubic foot and showed a cold crushing strength of 2450 lbs. per square inch. After coking at 800° C., the shape showed a cold crushing strength of 4500 lbs. per square inch.

*Example II*

A refractory composition as in Example I except that 2.6 parts by weight of the periclase passing a 100 mesh screen was replaced by 2.6 parts by weight volatilized silica. After forming and drying as in Example I, the shapes showed a bulk density of 166 lbs. per cubic foot and a cold crushing strength of 5950 lbs. per square inch. After coking at 800° C., the cold crushing strength was 7630 lbs. per square inch.

*Example III*

To 92 parts by weight of the periclase used in Example I was added 5% of 300°–320° F. softening point pitch, 1.5 parts by weight volatilized silica and 1.5 parts by weight sodium tripolyphosphate. The dry ingredients were mixed with about 3.5% water and formed into specimens 2" in diameter and 3" high under a pressure of 10,000 lbs. per square inch. After drying the specimens showed a cold crushing strength of 7780 p.s.i. and a cold crushing strength after coking at 850° C. for 8 hours of 8790 p.s.i. By comparison, a similar mixture consisting of 93 parts of the same periclase, 5 parts of the same pitch, and 2 parts sodium tripolyphosphate subjected to the same processing showed a cold crushing strength after drying of only 4380 p.s.i. and after coking of only 5660 p.s.i.

*Example IV*

Ninety-two parts by weight of a periclase containing over 95% MgO, all of which was smaller than ⅜" and 20% of which passed a 100 mesh screen, was mixed with 5 parts by weight of a 300°–325° F. pitch, 1.5 parts by weight of volatilized silica, and 1.5 parts by weight Kieserite (a naturally occurring hydrated magnesium sulfate, $MgSO_4 \cdot H_2O$). Brick pressed from this composition (after the addition of about 3.5% water) showed a cold crushing strength, after drying at 300° F. of 5750 p.s.i.

*Example V*

The composition of Example IV, with fired silica-stabilized dolomite, all of which passed a 100 mesh screen, substituted for the periclase passing a 100 mesh screen was made into brick in the same manner. The brick showed a cold crushing strength after drying of 2980 p.s.i., a good strength for shapes made with dolomite.

In the specification and claims, percentages and parts are by weight unless otherwise indicated. Mesh sizes referred to herein are Tyler standard screen sizes which are defined in Chemical Engineers' Handbook, John H. Perry, Editor in Chief, 3rd Edition, 1950, published by McGraw Hill Book Company, at page 963. For example, a size passing a 100 mesh screen corresponds to 147 microns, and that passing a 200 mesh screen 74 microns.

Having described the invention, what is claimed is:

1. The method of making refractory shapes comprising mixing nonacid refractory grain, from 2% to 10% of the total weight of dry ingredients of a pitch having a softening point of at least 250° F., from 0.5% to 4% of the total weight of dry ingredients of volatilized silica, and a tempering amount of water; forming said mixture into a refractory shape; and drying said shape at a temperature substantially as high as the softening point of the pitch.

2. The method of making a refractory shape comprising mixing nonacid refractory grain, from 2% to 10% of the total weight of dry ingredients of a pitch with a softening point of at least 250° F., from 0.5% to 4% of the total weight of dry ingredients of volatilized silica, from 0.5% to 3% of the total weight of dry ingredients of sodium tripolyphosphate, and a tempering amount of water; forming said mixture into a refractory shape; and drying said shape at a temperature substantially as high as the softening point of the pitch.

3. The method of making a refractory shape comprising mixing periclase grain, from 2% to 10% of the total weight of dry ingredients of a pitch, all of which passes a 100 mesh screen, said pitch having a softening point from about 300° F. to about 325° F., from 0.5% to 4% of the total weight of dry ingredients of volatilized silica, and from 2% to 5% tempering water; forming said mixture into a refractory shape under pressure; and drying said shape at a temperature of at least 150° C.

4. A refractory composition adapted to be formed into shape with incorporation of tempering water consisting essentially of: from 2% to 10% pulverized pitch, all of which passes a 100 mesh screen, having a softening point of at least 250° F.; from 0.5% to 4% volatilized silica; the balance being nonacid refractory grain.

5. A refractory composition adapted to be formed into shape with incorporation of tempering water consisting essentially of from 2% to 10% of a pitch having a softening point of at least 250° F., from 0.5% to 4% volatilized silica, from 0.5% to 3% of sodium tripolyphosphate, the balance being nonacid refractory grain.

References Cited by the Examiner

UNITED STATES PATENTS

| | | | |
|---|---|---|---|
| 2,943,240 | 6/1960 | Martinet | 106—58 |
| 3,075,848 | 1/1963 | Davies et al. | 106—58 |
| 3,168,602 | 2/1965 | Davies et al. | 106—58 |
| 3,193,402 | 7/1965 | Rusoff et al. | 106—58 |

TOBIAS E. LEVOW, *Primary Examiner.*

J. E. POER, *Assistant Examiner.*